(12) United States Patent
Ohtsuka

(10) Patent No.: US 6,540,643 B2
(45) Date of Patent: Apr. 1, 2003

(54) CONTROL APPARATUS FOR SYNCHROMESH TYPE AUTOMATIC TRANSMISSION

(75) Inventor: Toshio Ohtsuka, Hyogo-ken (JP)

(73) Assignee: Mitsubishi Kenki Kabushiki Kaisha, Tokyo (JP)

(*) Notice: Subject to any disclaimer, the term of this patent is extended or adjusted under 35 U.S.C. 154(b) by 51 days.

(21) Appl. No.: 09/733,902

(22) Filed: Dec. 12, 2000

(65) Prior Publication Data

US 2001/0051558 A1 Dec. 13, 2001

(30) Foreign Application Priority Data

Jun. 12, 2000 (JP) .......................... 2000-175066

(51) Int. Cl.[7] .............................................. B60K 41/02
(52) U.S. Cl. ...................... 477/83; 477/87; 477/107; 477/181
(58) Field of Search ............................ 477/83, 86, 87, 477/90, 107, 179, 181

(56) References Cited

U.S. PATENT DOCUMENTS 4,480,732 A * 11/1984 Takano et al. .............. 477/87
4,591,038 A * 5/1986 Asagi et al. ................ 477/78
4,730,711 A * 3/1988 Sakakiyama ............... 477/87
5,099,969 A * 3/1992 Ohtake ...................... 477/86

FOREIGN PATENT DOCUMENTS

JP 360011720 A * 1/1985 .......... 477/176
JP 60-35633 2/1985
JP 360034525 A * 2/1985 .......... 477/175

* cited by examiner

Primary Examiner—Rodney H. Bonck
Assistant Examiner—Ha Ho
(74) Attorney, Agent, or Firm—Sughrue Mion, PLLC

(57) ABSTRACT

A control apparatus for a synchromesh automatic transmission (3) for automatically changing over a plurality of speed gear stages from one to another in an internal combustion engine (1), which apparatus is capable of suppressing occurrence of rapid deceleration of the engine, engine blowup or like problems even when the accelerator pedal is manipulated during a period in which the throttle valve is being closed. The control apparatus includes an electromagnetic clutch (2), an accelerator pedal position sensor (13), an engine rotation speed sensor (15), and a control unit (4) arranged such that upon decision of start of upshift operation, a closing speed of an electronically controlled throttle valve (11) is arithmetically determined by the control unit (4) on the basis of a data map prepared in advance with opening degree of the throttle valve (11) being controlled in response to a command value issued by the control unit (4).

3 Claims, 8 Drawing Sheets

CONTROL APPARATUS FOR SYNCHROMESH TYPE AUTOMATIC TRANSMISSION

BACKGROUND OF THE INVENTION

1. Field of the Invention

The present invention generally relates to a control apparatus for a synchromesh type automatic transmission for an internal combustion engine of a motor vehicle. More particularly, the present invention is concerned with a technique for suppressing or mitigating a rapid or steep change of engine speed, e.g. rapid deceleration which may occur when an electromagnetic clutch is released upon starting of up-shift gear change operation.

2. Description of Related Art

As one of the methods of controlling the automatic transmission of synchromesh type, there may be mentioned a technique disclosed in Japanese Unexamined Patent Application Publication No. 35633/1985 (JP-A-60-35633). According to this control method, the clutch-releasing rate or speed (also referred as the clutch-off speed) and the throttle valve closing rate or speed are changed upon starting of the gear shift (speed change) operation in dependence on the depression stroke or position of an accelerator pedal which thus serves as a control parameter.

In the conventional control of the synchromesh type automatic transmission in which the depression stroke of the accelerator pedal is employed as the control parameter as mentioned above, there arises problems mentioned below. In general, correlation between the closing operation of the clutch and that of the throttle valve is not to be satisfactory. More specifically, when the accelerator pedal is manipulated during a period in which the throttle valve is controlled in the closing direction after the gear shift operation (speed change operation) has been started, there may arise such situation that the clutch remains yet to be opened (released) notwithstanding the throttle valve has reached the closed position or the clutch assumes the released (off) position before the throttle valve has reached the closed position, as a result of which rapid deceleration of the engine and hence the motor vehicle and/or a so-called engine blowup event may take place, giving rise to the problem.

SUMMARY OF THE INVENTION

In the light of the state of the art described above, it is an object of the present invention to provide a control apparatus for a synchromesh type automatic transmission which apparatus is capable of preventing or suppressing occurrence of raid deceleration of the engine, the engine blowup event or the like problem even when the accelerator pedal is manipulated in the course of the throttle valve being closed. To this end, the present invention teaches that when upshift operation is decided, a time point for starting the clutch releasing (clutch-off) operation is determined on the basis of a throttle valve closing speed which in turn is determined on the basis of the throttle opening degree at the time point for starting the upshift operation and the time taken for the clutch to be released or opened which time in turn is determined on the basis of a clutch exciting current and the engine rotation speed at the above-mentioned time point.

In view of the above and other objects which will become apparent as the description proceeds, there is provided according to a general aspect of the present invention a control apparatus for a synchromesh type automatic transmission for automatically changing over a plurality of speed gear stages from one to another in an internal combustion engine, which apparatus includes an electromagnetic clutch capable of assuming alternatively a torque transmitting state and a torque interrupting state in response to a change of an exciting current fed to the electromagnetic clutch, an accelerator pedal position sensor for detecting a depression stroke of an accelerator pedal, an engine rotation speed sensor for detecting a rotation speed (rpm) of the engine, an electronically controlled throttle valve for adjusting an intake air quantity of the engine on the basis of an output signal of the accelerator pedal position sensor, and a control unit receiving as inputs thereto output signals of the accelerator pedal position sensor and the engine rotation speed sensor, respectively, wherein the control unit is arranged such that upon decision of start of upshift operation, the control unit controls a closing rate or speed of the electronically controlled throttle valve on the basis of the output signal generated by the accelerator pedal position sensor at a time point when the start of upshift operation is decided, so that the electronically controlled throttle valve assumes a fully closed position when the electromagnetic clutch assumes an open (off) position.

With the arrangement of the synchromesh type automatic transmission described above, the time point for starting the clutch releasing (clutch-off) operation can be determined on the basis of the throttle valve closing rate or speed which in turn is determined on the basis of the throttle opening degree at the time point for starting the upshift operation and the time taken for the clutch to be released or opened which time in turn is determined on the basis of a clutch exciting current and the engine rotation speed at the above-mentioned time point. By virtue of this arrangement, rapid deceleration of the engine, the engine blowup event or the like problem which the conventional synchromesh type automatic transmission suffers due to unsatisfactory relation between the clutch-on position and the throttle-closed position can effectively be suppressed.

In a preferred mode for carrying out the invention, the control unit may be so designed as to estimate a time taken for the electronically controlled throttle valve to reach the fully closed position on the basis of the closing rate or speed of the electronically controlled throttle valve and the throttle opening degree thereof at the time point when the upshift operation is started.

With the arrangement of the synchromesh type automatic transmission described above, degradation of comfortableness of the speed change operation due to occurrence of rapid deceleration can positively be prevented.

In another mode for carrying out the invention, the control unit may preferably be so designed as to arithmetically determine a time taken for the electromagnetic clutch to assume the open (off) state on the basis of a preset value of the exciting current at a time point when the clutch releasing operation is started on one hand and the engine rotation speed on the other hand.

With the arrangement of the synchromesh type automatic transmission described above, degradation of comfortableness of the speed change operation due to occurrence of rapid deceleration of the engine and the so-called engine blowup phenomenon can satisfactorily be prevented.

In still another mode for carrying out the invention, the control unit may preferably be so designed as to arithmetically determine the time point at which the clutch releasing operation is started on the basis of a difference between the time taken for the electronically controlled throttle valve to assume the fully closed position and the time taken for the electromagnetic clutch to be released.

With the arrangement of the synchromesh type automatic transmission described above, degradation of comfortableness of the speed change operation due to occurrence of the rapid deceleration of the engine and the so-called engine blowup phenomenon can be prevented with enhanced reliability.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
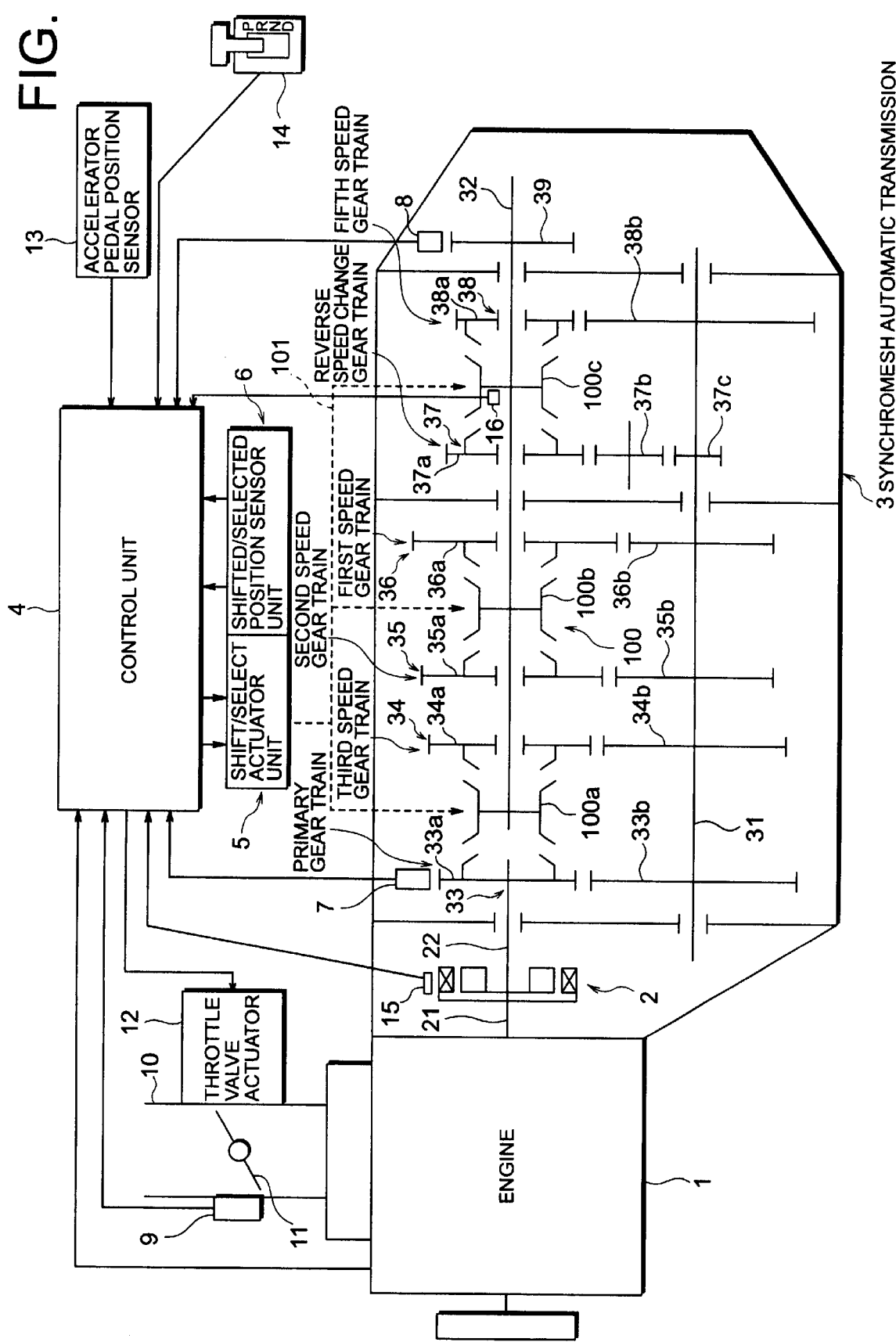
FIG. 1 is a view showing schematically a structure of a control apparatus for a synchromesh type automatic transmission according to an embodiment of the present invention.

The present invention will be described in detail in conjunction with what is presently considered as preferred or typical embodiments thereof by reference to the drawings. In the following description, like reference characters designate like or corresponding parts throughout the several views. Also in the following description, it is to be understood that such terms as "left", "right", "front" and "rear" the like are words of convenience and are not to be construed as limiting terms.

FIG. 1 is a view showing a structure of the control apparatus for a synchromesh type automatic transmission according to an embodiment of the present invention. In the figure, reference numeral 1 generally denotes an internal combustion engine (also referred to simply as the engine), 2 denotes an electromagnetic clutch (also referred to simply as the clutch), 3 denotes generally the synchromesh type automatic transmission, and reference numeral 4 denotes a control unit.

The engine 1 is equipped with an intake pipe 10 in which a throttle valve 11 is disposed. The opening degree of the throttle valve 11 is detected by a throttle position sensor 9 which is mounted on the intake pipe 10 at a position in the vicinity of the throttle valve 11, the output signal of the throttle position sensor 9 being supplied to the control unit 4.

Further, the depression stroke of the accelerator pedal (not shown) manipulated by a driver of the motor vehicle equipped with the engine system now concerned is detected by a accelerator pedal position sensor 13. More specifically, the accelerator pedal position sensor 13 is so designed as to generate an output signal indicative of the accelerator pedal depression stroke, which signal is also supplied to the control unit 4. The control unit 4 processes the output signal of the accelerator pedal position sensor 13 to arithmetically determine a desired throttle valve opening position which conform to the accelerator pedal depression stroke, whereon the control unit 4 controls the throttle valve 11 by means of a throttle valve actuator 12 via a feedback loop on the basis of deviation or difference between the desired throttle valve opening position mentioned above and the throttle valve opening degree or position detected by the throttle position sensor 9 to thereby cause the throttle valve opening degree or position to coincide with the desired throttle valve opening position. Further provided is an engine rotation speed sensor 15 which is disposed in the vicinity of a crank shaft 21 of the engine for detecting the rotation speed (rpm) thereof. A reverse gear switch 16 is disposed in the vicinity of a sleeve gear 100c of a shift gear unit 100 described later on and serves for detecting the meshing between the sleeve gear 100c and a driven gear 37a of a reverse (backward) speed change gear train 37 also described hereinafter.

The electromagnetic clutch 2 is interposed between the crank shaft 21 of the engine 1 and an input shaft 22 of the synchromesh type automatic transmission 3 for controlling transmission/interruption of motion or torque from the crank shaft 21 to the input shaft 22 of the synchromesh type automatic transmission 3. The electromagnetic clutch 2 is supplied with a clutch exciting current which is in proportion to the torque to be transmitted through the clutch under the control of the control unit 4, to thereby transmit or transfer the torque of the crank shaft 21 to the input shaft 22 of the synchromesh type automatic transmission 3 as the controlled torque.

The synchromesh type automatic transmission 3 is presumed as being implemented in the form of a five stage speed change gear drive of counter shaft type which is comprised of, for example, five sets of forward speed change gear trains 33 to 36 and 38 and one set of backward or reverse speed change gear train 37, and a shift gear unit 100 which includes a plurality of sleeve gears 100a to 100c for changing over coupling between the speed change gear trains and an output shaft 32. In the case of the illustrated synchromesh type automatic transmission 3, it is also presumed that the shift gear unit 100 includes three sleeve gears. The input torque transmitted to the input shaft 22 from the crank shaft 21 through the medium of the electromagnetic clutch 2 is transmitted to a counter shaft 31 disposed in parallel to the input shaft 22 by way of a primary gear train 33 disposed frontmost (leftmost as viewed in FIG. 1). The output shaft 32 is disposed coaxially with the input shaft 22. Mounted rotatably on the output shaft 32 are driven gears 33a to 36a and 38a of the forward speed change gear trains 33 to 36 and 38, respectively, and additionally the driven gear 37a of the reverse speed change gear train 37. On the other hand, mounted fixedly on the counter shaft 31 which is disposed in parallel with the output shaft 32 are driving gears 33b to 36b of the forward speed change gear trains 33 to 36 and 38, respectively, and a driving gear 37c of the reverse speed change gear train 37 which engages an intermediate gear 37b which is in turn in engagement with the driven gear 37a. Furthermore, a first sleeve gear 100a is disposed axially movably and nonrotatably on the output shaft 32 at the front side of the third speed gear train 34 (i.e., between the primary gear train 33 and the third speed gear train 34), a second sleeve gear 100b is disposed axially movably and nonrotatably on the output shaft 32 between the second speed gear train 35 and the first (or low) speed gear train 36, and a third sleeve gear 100c is disposed axially movably and nonrotatably on the output shaft 32 between the reverse speed change gear train 37 and the fifth (or over top) speed gear train 38. The first sleeve gear 100a is adapted to be moved along the output shaft 32 by means of a shift fork 101 described later on to be thereby coupled with the driven gear 33a of the primary gear train 33, whereby the input shaft 22 of the automatic transmission and the output shaft 32 thereof are directly coupled to each other. In that case, the first sleeve gear 100a serves as the fourth speed gear. The torque transmission path and the speed change ratio (gear ratio of the primary gear×gear ratio of the relevant speed gear) change in dependence on which of the driven gears 33a to 36a and 38a of the forward speed change gear trains 33 to 36 and 38 and the driven gear 37a of the reverse speed change gear train 37 is selected. operated under the control of the control unit 4. More specifically, the shift gear 100 is shifted by means of the shift/select actuator unit 5 for gear change which is controlled by the output signal of the control unit 4, whereby the speed change operation is realized by the release operation for releasing the mechanical meshing or engagement of the gears of the speed stage acting currently and the coupling operation for causing the succeeding speed stage gears to be meshed. By the way, the meshing or engagement between the driven gear 37a of the reverse speed change gear train 37 and the sleeve gear 100c is detected by the reverse gear switch 16.

Inputted to the control unit 4 are a shift lever position signal indicating the position of a shift lever 14 manipulated by the driver of the motor vehicle, the output signal of the accelerator pedal position sensor 13 indicating the depression stroke or position of the accelerator pedal (not shown) and the output signal of the output shaft rotation speed sensor 8 of the automatic transmission which sensor is adapted to detect the rotation speed (rpm) of the output shaft 32 of the transmission. In response to these signals, the control unit 4 arithmetically determines the speed stage suited for the current vehicle running state on the basis of a gear shift pattern (not shown) of the transmission to thereby output an appropriate control signal to the shift/select actuator unit 5 for shifting the shift gear 100 while detecting the shifted/selected position of the shift lever 14 by means of the shifted/selected position sensor unit 6. Thus, the shift gear 100 is shifted by means of the shift/select actuator unit 5 which is controlled by the output signal of the control unit 4, whereby the speed change operation is realized by the release operation for releasing the mechanical meshing or engagement of the gears of the current speed stage and the coupling operation for causing the gears of the desired or target speed stage to be meshed.

The synchronous state of the shift gear 100 can be detected on the basis of the relation between the input shaft rotation speed (rpm) of the transmission and the output shaft rotation speed thereof detected by the input shaft rotation speed sensor 7 and the output shaft rotation speed sensor 8, respectively, of the transmission. For changing the speed, the throttle valve 11 is closed to a predetermined throttle position by means of the throttle valve actuator 12 while the exciting current fed to the electromagnetic clutch 2 is interrupted, whereby the synchromesh type automatic transmission is set to the power-off state. In this state, the speed stage changeover (gear change) operation is performed.

Figure 2:
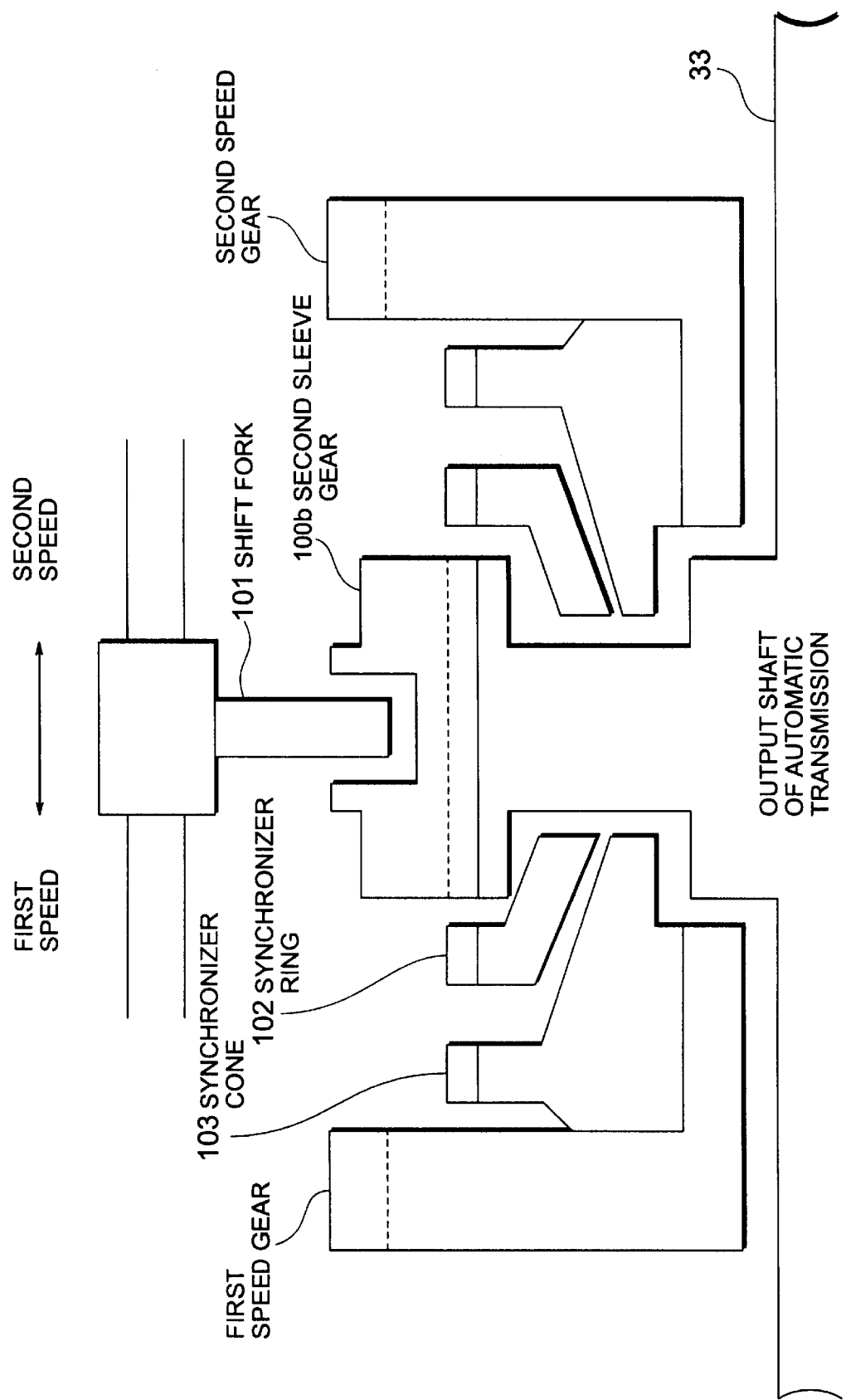
FIG. 2 is a view for illustrating a structure of a synchronizing mechanism for first to second speed gear change in the synchromesh type automatic transmission shown in FIG. 1.

FIG. 2 is a view for illustrating operation of the shift gear unit 100 upon gear change from the first speed gear (first speed stage or range) to the second speed gear (second speed stage or range) in the synchromesh type automatic transmission according to the instant embodiment of the present invention. At the first speed stage, the second sleeve gear 100b of the shift gear unit 100 is meshing or working with the synchronizer ring 102 and the synchronizer cone 103 of the first speed gear, whereby the torque is transmitted from the first speed gear to the output shaft 33 of the transmission by way of the second sleeve gear 100b. When the command for speed change from the first speed stage or range to the second speed stage or range is issued, the shift fork 101 is caused to shift toward the second speed gear by means of the shift/select actuator unit 5 under the control of the control unit 4, as a result of which the mechanical meshing between the second sleeve gear 100b and the first speed gear is released, whereon the synchronizer ring 102 for the second speed range is caused to move toward the second speed gear by the second sleeve gear 100b to be pressed against the synchronizer cone 103. Thus, the output shaft 33 of the transmission and the second speed gear shaft are caused to rotate synchronously, bringing about the mechanical meshing between the second sleeve gear 100b on one hand and the gears of the synchronizer ring 102 and the synchronizer cone 103 on the other hand. Then, the speed change operation from the first speed range to the second speed range is completed.

Figure 3:
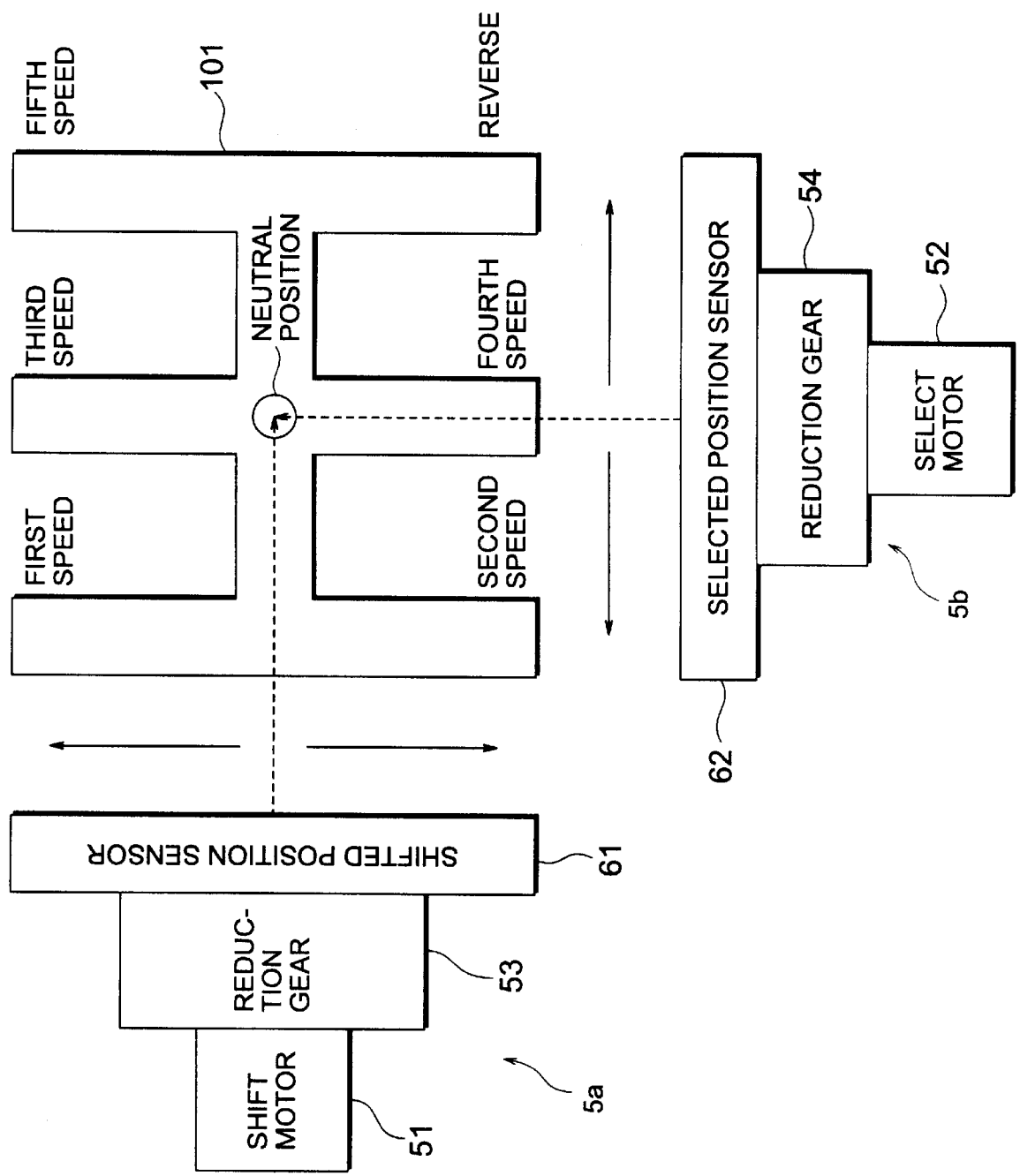
FIG. 3 is a view showing schematically a structural arrangement of a shift/select actuator unit and a shifted/selected position sensor unit in the synchromesh type automatic transmission shown in FIG. 1.

FIG. 3 is a view showing schematically a structures of the shift/select actuator unit 5 and the shifted/selected position sensor unit 6 in the synchromesh type automatic transmission according to the instant embodiment of the present invention.

As is shown in FIG. 3, the shift/select actuator unit 5 is comprised of a shift actuator 5a for driving or actuating the shift fork 101 and a select actuator 5b for selectively driving the shift fork 101. The shift actuator 5a includes a shift motor 51 for moving the shift fork 101 in the axial direction of the output shaft 32 and a reduction gear 53 for transmitting the driving power of the shift motor 51 to the shift fork 101 with speed reduction. On the other hand, the select actuator 5b includes a select motor 52 for moving the shift fork 101 in the rotational direction and a reduction gear 54 for transmitting the driving power of the select motor 52 to the shift fork 101 with speed reduction.

The shifted/selected position sensor unit 6 is composed of a shifted position sensor 61 disposed adjacent to the reduction gear 53 of the shift actuator 5a for detecting the shifted position of the shift fork 101 and a selected position sensor 62 disposed adjacent to the reduction gear 54 of the select actuator 5b for detecting the selected position of the shift fork 101.

The shift operation is carried out under the control of the control unit 4 in the manner described below. The shift fork 101 is driven in the axial direction of the output shaft 32 of the automatic transmission by the shift motor 51 incorporated in the shift actuator 5a through the medium of the reduction gear 53. In that case, the shifted position of the shift fork 101 is detected by the shifted position sensor 61, whereon the signal indicative of the shifted position is fed back to the control unit 4. In other words, the feedback control for the shifted position is performed.

Similarly, the select operation is carried out under the control of the control unit 4 in the manner described below. The shift fork 101 is driven in the rotational direction of the output shaft 32 of the automatic transmission by the select motor 52 incorporated in the select actuator 5b through the medium of the reduction gear 54 so that the shift fork 101 selectively meshes or engages with one of the sleeve gears 100a to 100c of the shift gear unit 100. In that case, the selected position of the shift fork 101 is detected by the selected position sensor 62, whereon the signal indicative of the selected position is fed back to the control unit 4. In other words, the feedback control for the selected position is performed.

Figure 4:
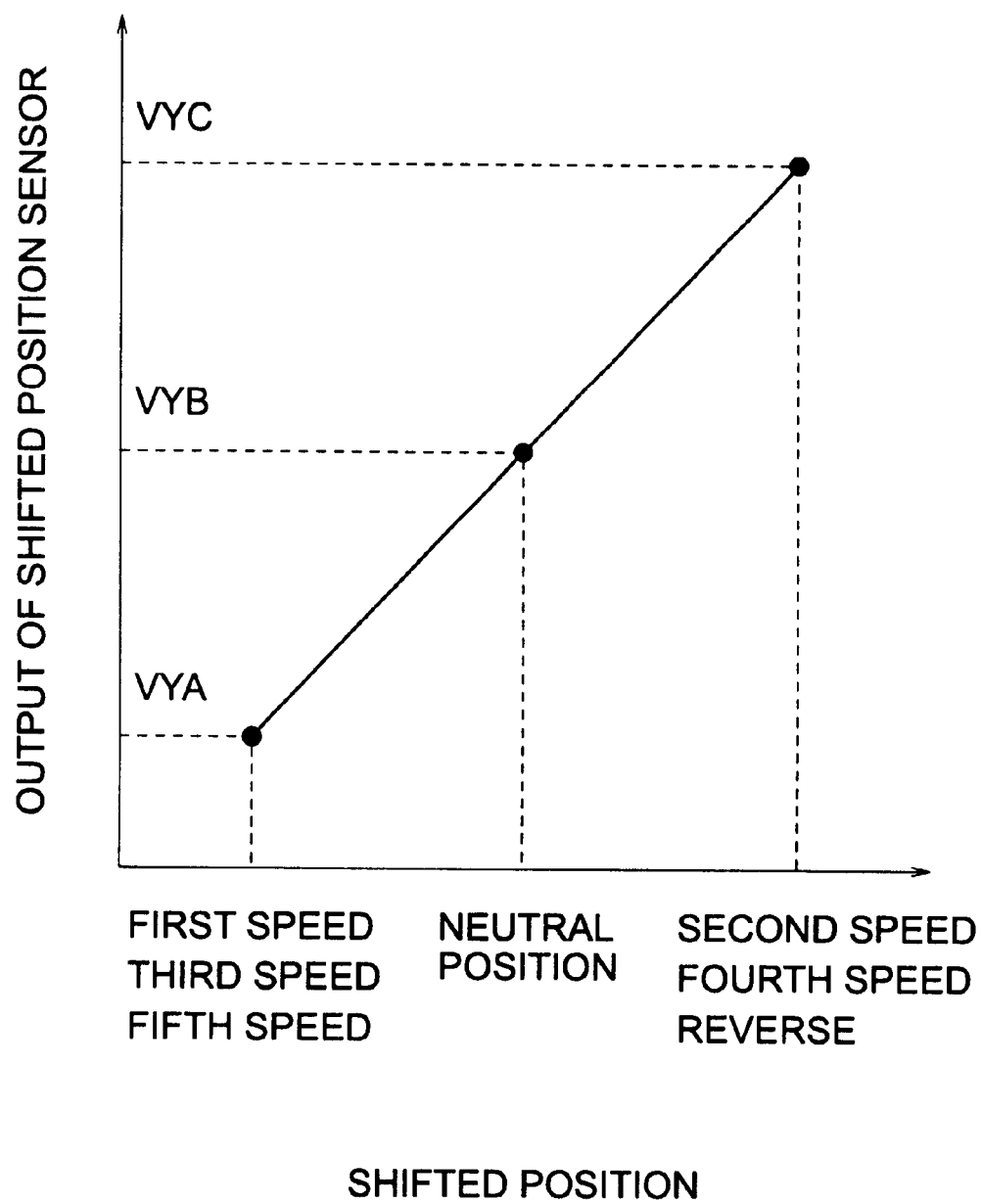
FIG. 4 is a view showing graphically relations between shifted positions of a shift fork and output characteristics of a shifted position sensor in the synchromesh type automatic transmission according to the invention.

FIG. 4 is a view showing graphically relations between the shifted positions of the shift fork 101 and the output characteristics of the shifted position sensor 61 described previously. In the figure, VYA represents a learned voltage value indicating the shifted position at the first, third and fifth speed stages, VYB represents a learned voltage value indicating the shifted position at the neutral position, and VYC represents a learned voltage value indicating the shifted position at the second and fourth speed stages and the reverse stage, respectively.

Figure 5:
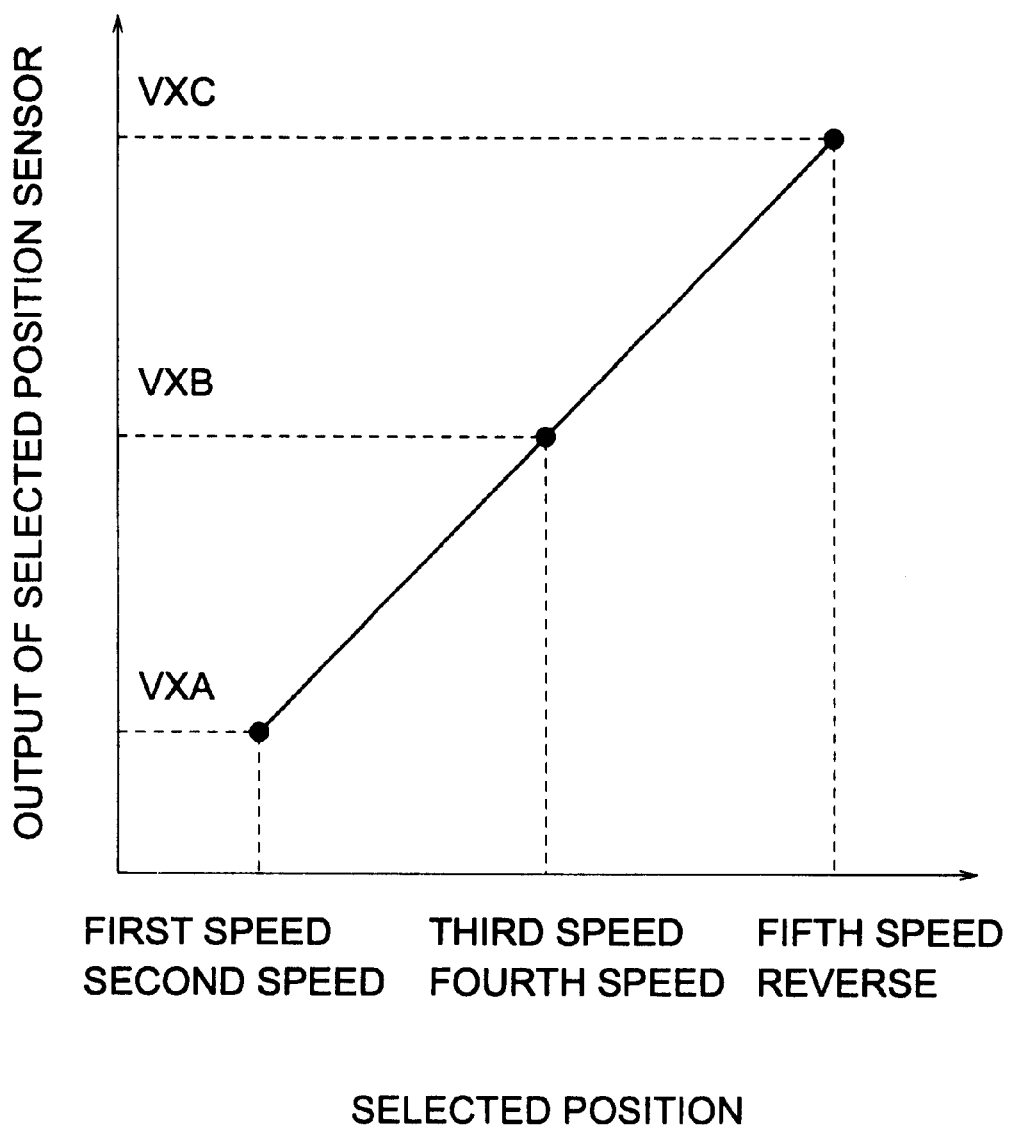
FIG. 5 is a view showing graphically relations between selected positions of the shift fork and output characteristics of a selected position sensor in the synchromesh type automatic transmission according to the invention.

FIG. 5 is a view showing graphically relations between the selected positions of the shift fork 101 and the output characteristics of the selected position sensor 62 described above. In the figure, VXA represents a learned voltage value indicating the selected position at the first and second speed stages, VXB represents a learned voltage value indicating the selected position at the third and fourth speed stages (including the neutral position), and VXC represents a learned voltage value indicating the selected position at the fifth speed stage and the reverse stage, respectively.

Figure 6:
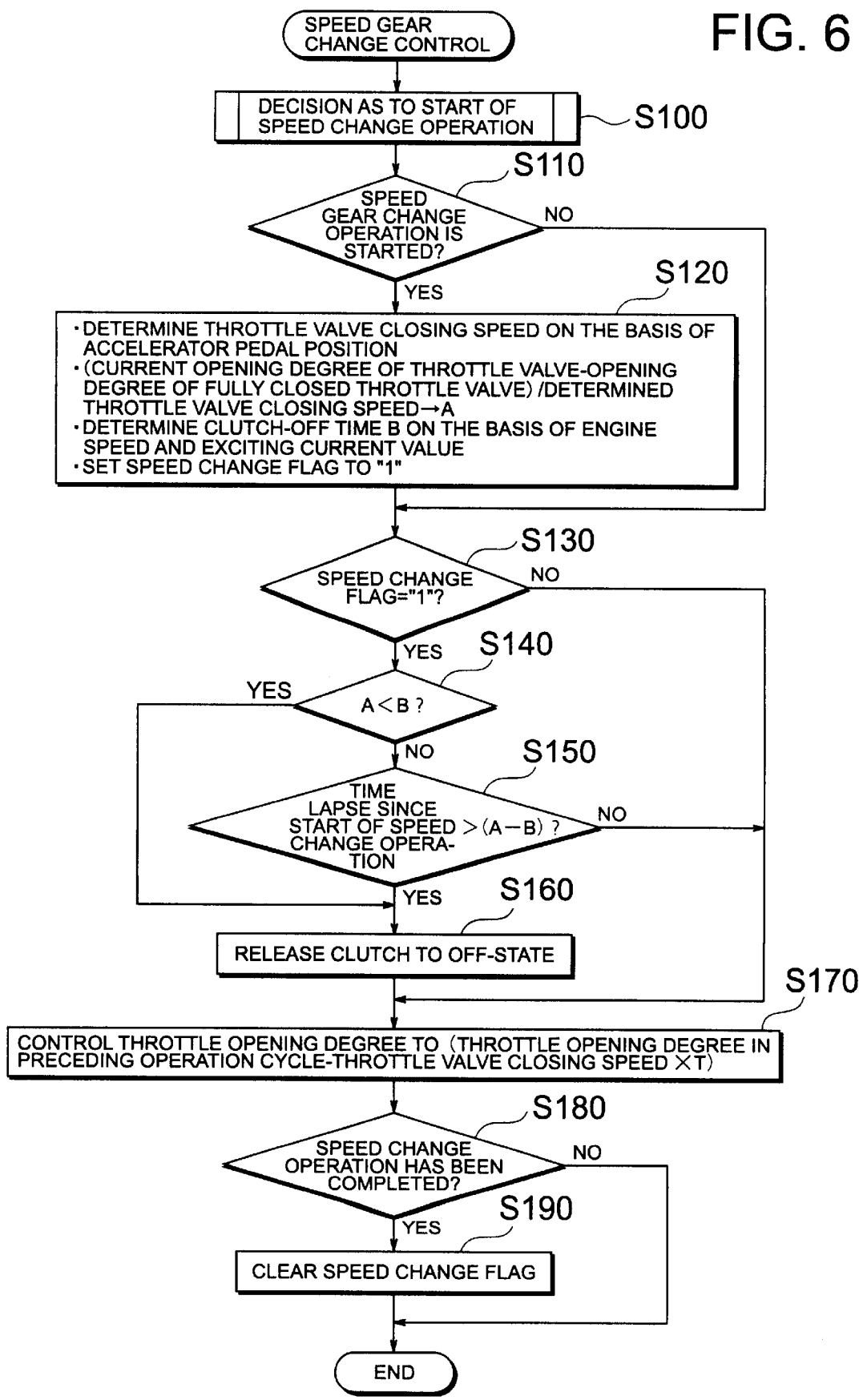
FIG. 6 is a flow chart for illustrating a throttle valve closing control procedure and a clutch-off control procedure upon starting of the speed gear change in the synchromesh type automatic transmission according to the invention.

Now, description will turn to operation of the synchromesh type automatic transmission according to the instant embodiment of the invention by reference to the flow FIG. 6 which shows a flow chart illustrating a throttle valve closing control procedure and a clutch release (clutch off) control procedure upon starting of the speed gear changing operation.

Referring to FIG. 6, in a step S110, decision is made as to whether or not the speed change operation has been started through a speed change operation start decision subroutine (step S100). When the decision in the step S110 results in affirmation "YES", then the throttle valve closing rate or speed is determined on the basis of the position of the accelerator pedal. Then, the time A taken for closing fully the throttle valve is determined in accordance with the following expression:

$$A = \text{(current opening degree of throttle valve–opening degree of fully closed throttle valve)/determined throttle valve closing speed.}$$

Furthermore, the clutch-off time (i.e., time taken for the clutch to be released to the off-state) B is arithmetically determined on the basis of the engine rotation speed and the exciting current, whereon a speed change flag is set to "1" in a step S120.

On the other hand, when the decision step S110 results in negation "NO", the processing proceeds to a step S130 by skipping the step S120. In the step S130, it is decided whether the speed change is being validated (i.e., whether or not the speed change flag is set to "1"). When this decision step S130 results in affirmation "YES", then the time A taken for closing fully the throttle valve and the clutch-off time B are compared with each other. In case A<B, the processing proceeds to a step S160 where the clutch is released to the off-state. On the other hand, when the decision step S140 results in that A>B, the time lapsed from the time point the speed change operation was started to the current time point is compared with the time difference or period given by A–B in a step S150. When the time lapse mentioned above is longer than the time period (A–B), the processing proceeds to the step S160 where the clutch is released to the off-state. On the other hand, unless the above-mentioned time lapse does not exceed the time difference (A–B), the processing proceeds to a step S170. Further, after the clutch has been released in the step S160, the step S170 is executed.

In the step S170, the throttle opening degree in the current operation cycle is arithmetically determined in accordance with the following expression:

throttle opening degree in current operation cycle=throttle opening degree in preceding operation cycle–(throttle valve closing speed×A).

At this juncture, with the phrase "throttle valve closing speed", it is intended to mean the decreasing rate of the throttle opening degree during one cycle operation. In succession, decision is made in a step S180 as to whether the speed change operation has been completed. When this decision step S180 results in "YES", a step S190 is executed to clear the speed change flag, whereupon the processing comes to an end. On the other hand, when the step S180 results in "NO", the processing is terminated without clearing the speed change flag.

Figure 7:
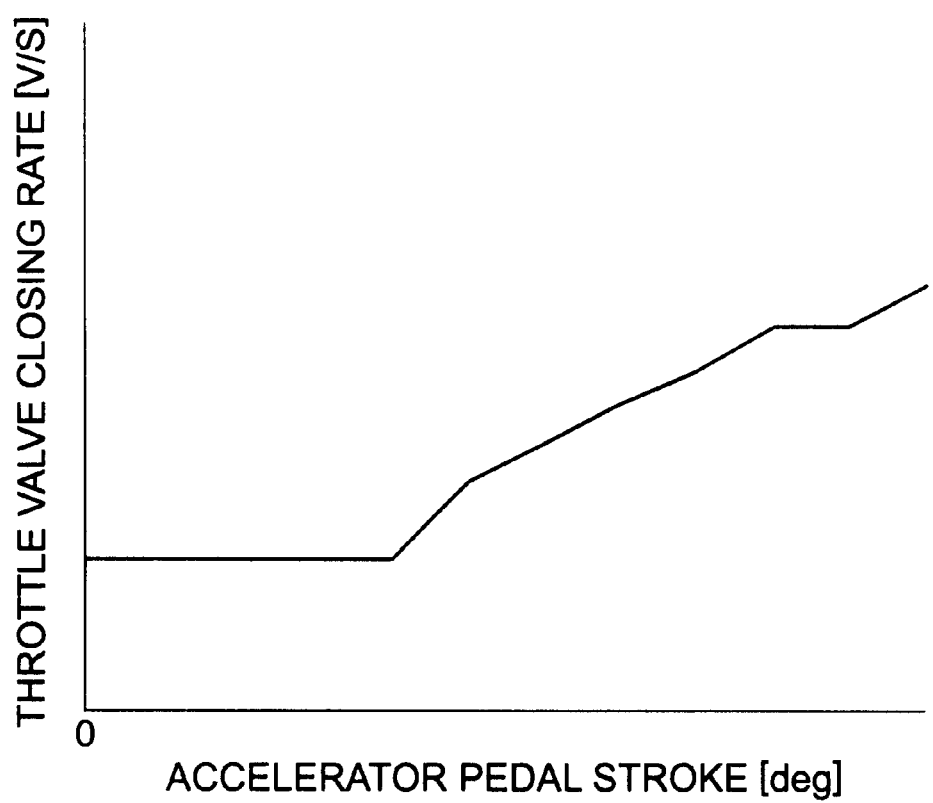
FIG. 7 is a view for graphically illustrating a relation between a throttle opening degree at the time point when a speed change operation is started and a throttle valve closing speed in the synchromesh type automatic transmission according to the invention.

FIG. 7 is a view for graphically illustrating a relation between the throttle opening degree at the time point when the speed change operation is started and the throttle valve closing rate or speed.

Figure 8:
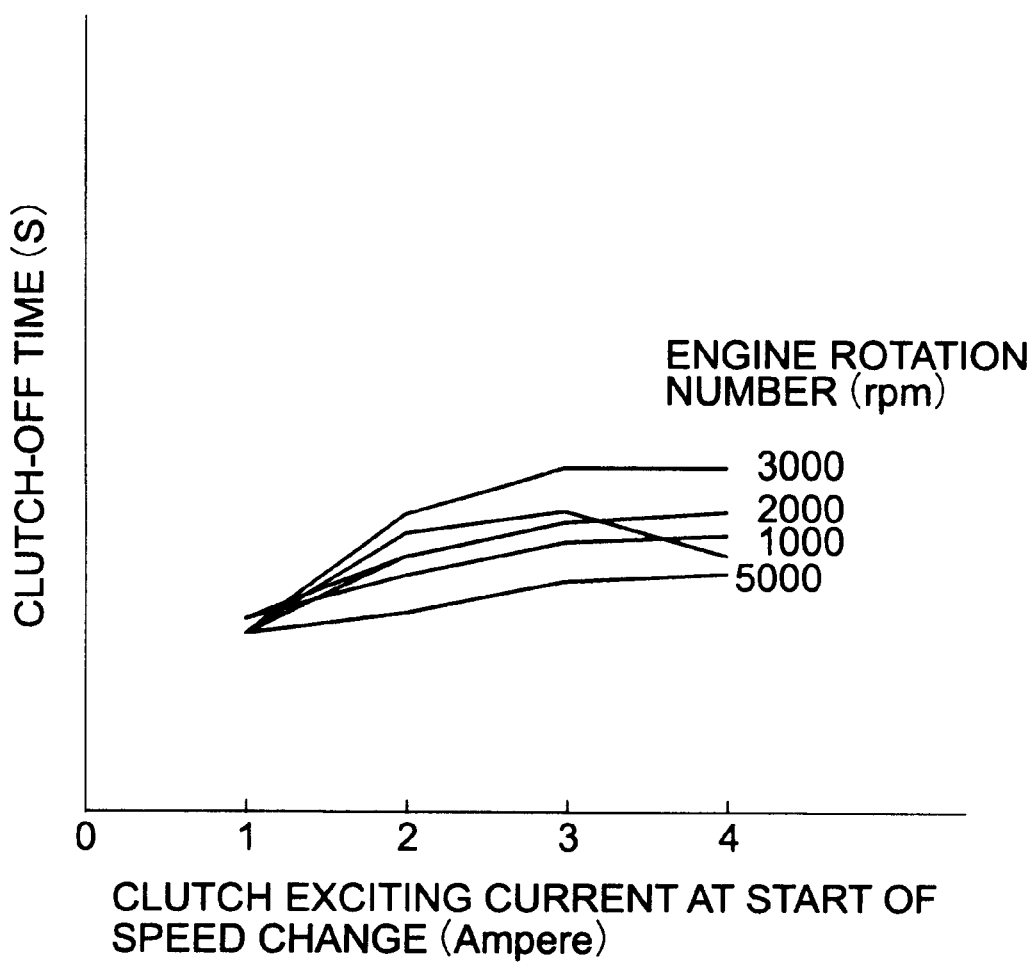
FIG. 8 is a view graphically showing relations between the clutch exciting current at a time point when the speed change operation is started and a clutch-off time at the time point when speed change operation is started at various engine rotation speeds employed as parameters in the synchromesh type automatic transmission according to the invention.

FIG. 8 is a view graphically showing relations between the clutch exciting current at the time point when the speed change operation is started and the clutch-off time with various engine rotation speeds (1000, 2000, 3000 and 5000 rpm) being used as parameters.

Through the control procedure described above, the throttle valve closing rate or speed is first determined in dependence on the throttle opening degree at the time point when the speed change operation is started, and then the clutch is released to the off-state (i.e., the state where no torque is transmitted through the clutch) at the time point at which the throttle valve is fully closed. Thus, mismatch between the throttle opening degree and magnitude of the torque transmitted through the clutch can positively be suppressed even when the throttle opening degree should change after the speed change operation has been started.

Besides, because the clutch is released to the off-state in timing with full-closing of the throttle valve, steep change of the engine speed such as rapid deceleration thereof upon releasing of the clutch can be mitigated with the blowup of the engine mentioned hereinbefore being prevented. Thus, comfortable speed change operation can be realized.

Many modifications and variations of the present invention are possible in the light of the above techniques. It is therefore to be understood that within the scope of the appended claims, the invention may be practiced otherwise than as specifically described.

What is claimed is:

1. A control apparatus for a synchromesh type automatic transmission for automatically changing over a plurality of speed gear stages from one to another in an internal combustion engine, comprising:

an electromagnetic clutch capable of assuming alternatively a torque transmitting state and a torque interrupting state in response to a change of an exciting current fed to said electromagnetic clutch;

an accelerator pedal position sensor for detecting a depression stroke of an accelerator pedal;

an engine rotation speed sensor for detecting a rotation speed (rpm) of said engine;

an electronically controlled throttle valve for adjusting an intake air quantity of said engine on the basis of an output signal of said accelerator pedal position sensor; and a control unit receiving as inputs thereto output signals of said accelerator pedal position sensor and said engine rotation speed sensor, respectively, said control unit being arranged such that upon decision of start of upshift operation, said control unit controls a closing speed of said electronically controlled throttle valve on the basis of the output signal generated by said accelerator pedal position sensor at a time point when the start of upshift operation is decided, so that said electronically controlled throttle valve assumes a fully closed position when said electromagnetic clutch assumes an open (off) position, wherein said control unit is so designed as to estimate a time taken for said electronically controlled throttle valve to reach the fully closed position on the basis of said closing speed of said electronically controlled throttle valve and the throttle opening degree thereof at the time point when said upshift operation is started.

2. A control apparatus for a synchromesh type automatic transmission for automatically changing over a plurality of speed gear stages from one to another in an internal combustion engine, comprising:

an electromagnetic clutch capable of assuming alternatively a torque transmitting state and a torque interrupting state in response to a change of an exciting current fed to said electromagnetic clutch;

an accelerator pedal position sensor for detecting a depression stroke of an accelerator pedal;

an engine rotation speed sensor for detecting a rotation speed (rpm) of said engine;

an electronically controlled throttle valve for adjusting an intake air quantity of said engine on the basis of an output signal of said accelerator pedal position sensor; and a control unit receiving as inputs thereto output signals of said accelerator pedal position sensor and said engine rotation speed sensor, respectively, said control unit being arranged such that upon decision of start of upshift operation, said control unit controls a closing speed of said electronically controlled throttle valve on the basis of the output signal generated by said accelerator pedal position sensor at a time point when the start of upshift operation is decided, so that said electronically controlled throttle valve assumes a fully closed position when said electromagnetic clutch assumes an open (off) position, wherein said control unit is so designed as to arithmetically determine a time taken for said electromagnetic clutch to assume the open (off) state on the basis of a preset value of said exciting current at a time point when the clutch releasing operation is started on one hand and said engine rotation speed on the other hand.

3. A control apparatus for a synchromesh type automatic transmission according to claim 2, wherein said control unit is so designed as to arithmetically determine said time point at which said clutch releasing operation is started on the basis of a difference between the time taken for said electronically controlled throttle valve to assume the fully closed position and the time taken for said electromagnetic clutch to be released.

* * * * *